United States Patent
Huslak et al.

(10) Patent No.: US 10,606,811 B2
(45) Date of Patent: *Mar. 31, 2020

(54) METHODS, COMPUTER PROGRAM PRODUCTS, AND SYSTEMS FOR AUTOMATICALLY SYNCHRONIZING DIRECTORY STRUCTURES ACROSS DIFFERENT APPLICATIONS

(71) Applicant: AT&T Intellectual Property I, L.P., Atlanta, GA (US)

(72) Inventors: Nicholas S. Huslak, Johns Creek, GA (US); Sharon E. Carter, Austell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/000,310

(22) Filed: Jun. 5, 2018

(65) Prior Publication Data

US 2018/0322139 A1    Nov. 8, 2018

Related U.S. Application Data

(63) Continuation of application No. 15/633,244, filed on Jun. 26, 2017, now Pat. No. 10,013,428, which is a
(Continued)

(51) Int. Cl.
*G06F 16/00*    (2019.01)
*G06F 16/178*    (2019.01)
(Continued)

(52) U.S. Cl.
CPC .......... *G06F 16/178* (2019.01); *G06F 16/113* (2019.01); *G06F 16/13* (2019.01)

(58) Field of Classification Search
None
See application file for complete search history.

(56) References Cited

U.S. PATENT DOCUMENTS 7,035,878 B1    4/2006  Multer et al.
7,328,225 B1 *  2/2008  Beloussov .............. G06F 16/10
(Continued)

OTHER PUBLICATIONS www.whynot.net/ideas/622; Synchronize email and files; Sep. 18, 2008; 5 pgs.

*Primary Examiner* — Son T Hoang
(74) *Attorney, Agent, or Firm* — Garlick & Markison; Bruce E. Stuckman (57) ABSTRACT

Directory structures of a messaging application and a personal file manager application are synchronized. A designated layer in the directory structure of the messaging application is associated with the designated layer in the directory structure of the personal file manager application. Each time a folder is created or an existing folder is modified or deleted in the designated layer in the directory structure of the messaging application, a corresponding folder is created, modified, or deleted in the designated layer in the directory structure of the personal file manager application and vice versa. Files or links to files are created in the folders of the messaging application to correspond to files or links to files within folders in the personal file manager application, and vice versa. A folder (and its contents) is deleted in the messaging application to correspond to deletions in the personal file manager application, and vice versa.

20 Claims, 7 Drawing Sheets

Related U.S. Application Data continuation of application No. 15/260,884, filed on Sep. 9, 2016, now Pat. No. 9,720,929, which is a continuation of application No. 14/936,461, filed on Nov. 9, 2015, now Pat. No. 9,465,809, which is a continuation of application No. 14/341,958, filed on Jul. 28, 2014, now Pat. No. 9,201,893, which is a continuation of application No. 12/275,312, filed on Nov. 21, 2008, now Pat. No. 8,799,214.

(51) Int. Cl.
*G06F 16/13* (2019.01)
*G06F 16/11* (2019.01)

(56) References Cited

U.S. PATENT DOCUMENTS

| | | | |
|---|---|---|---|
| 2004/0006557 A1 | 1/2004 | Baker et al. | |
| 2004/0068523 A1* | 4/2004 | Keith, Jr. | G06F 16/1787 |
| 2004/0172423 A1* | 9/2004 | Kaasten | G06F 16/1787 |
| 2004/0225731 A1 | 11/2004 | Piispanen et al. | |
| 2005/0002501 A1 | 1/2005 | Elsey et al. | |
| 2005/0097225 A1 | 5/2005 | Glatt et al. | |
| 2005/0102328 A1 | 5/2005 | Ring et al. | |
| 2005/0149487 A1 | 7/2005 | Celik | |
| 2006/0248155 A1* | 11/2006 | Bondarenko | G06Q 10/107 709/206 |
| 2007/0072588 A1 | 3/2007 | Gorty et al. | |
| 2007/0174520 A1 | 7/2007 | Moon | |
| 2009/0138808 A1 | 5/2009 | Moromisato et al. | |
| 2010/0082548 A1* | 4/2010 | Crockett | G06F 16/93 707/662 |

\* cited by examiner

METHODS, COMPUTER PROGRAM PRODUCTS, AND SYSTEMS FOR AUTOMATICALLY SYNCHRONIZING DIRECTORY STRUCTURES ACROSS DIFFERENT APPLICATIONS

CROSS REFERENCE TO RELATED APPLICATIONS

The present U.S. Utility patent application claims priority pursuant to 35 U.S.C. § 120 as a continuation of U.S. Utility application Ser. No. 15/633,244, entitled "METHODS, COMPUTER PROGRAM PRODUCTS, AND SYSTEMS FOR AUTOMATICALLY SYNCHRONIZING DIRECTORY STRUCTURES ACROSS DIFFERENT APPLICATIONS", filed Jun. 26, 2017, which is a continuation of U.S. Utility application Ser. No. 15/260,884, entitled "METHODS, COMPUTER PROGRAM PRODUCTS, AND SYSTEMS FOR AUTOMATICALLY SYNCHRONIZING DIRECTORY STRUCTURES ACROSS DIFFERENT APPLICATIONS", filed Sep. 9, 2016, issued as U.S. Pat. No. 9,720,929 on Aug. 1, 2017, which is a continuation of U.S. Utility application Ser. No. 14/936,461, entitled "METHODS, COMPUTER PROGRAM PRODUCTS, AND SYSTEMS FOR AUTOMATICALLY SYNCHRONIZING DIRECTORY STRUCTURES ACROSS DIFFERENT APPLICATIONS", filed Nov. 9, 2015, issued as U.S. Pat. No. 9,465,809 on Oct. 11, 2016, which is a continuation of U.S. Utility application Ser. No. 14/341,958, entitled "METHODS, COMPUTER PROGRAM PRODUCTS, AND SYSTEMS FOR AUTOMATICALLY SYNCHRONIZING DIRECTORY STRUCTURES ACROSS DIFFERENT APPLICATIONS", filed Jul. 28, 2014, issued as U.S. Pat. No. 9,201,893 on Dec. 1, 2015, which is a continuation of U.S. Utility application Ser. No. 12/275,312, entitled "METHODS, COMPUTER PROGRAM PRODUCTS, AND SYSTEMS FOR AUTOMATICALLY SYNCHRONIZING DIRECTORY STRUCTURES ACROSS DIFFERENT APPLICATIONS," filed Nov. 21, 2008, issued as U.S. Pat. No. 8,799,214 on Aug. 5, 2014, all of which are hereby incorporated herein by reference in their entirety and made part of the present U.S. Utility patent application for all purposes.

FIELD OF THE INVENTION

This disclosure relates to directory structure synchronization, and, more particularly, to synchronization of directory structures across different applications.

DESCRIPTION OF THE BACKGROUND

Today, users of messaging services, such as Microsoft Outlook, and personal file management services, such as Windows Explorer, must maintain separate directory structures for each instance of those applications. For example, the directory structure of a personal file directory (viewed, e.g., in Windows Explorer) has no relationship to the directory structure that is used to store emails (viewed, e.g., in Outlook), unless the user manually creates a relationship between the directory structures and continues to align them. While it is possible to manually copy messages from a messaging application to a personal file manager application, the latter application would not show useful information, such as "from" and "to" headers associated with the message. Similarly, while it is possible to manually copy a file stored in a personal file manager application to a folder in a messaging application, the latter application does not usually display the file type (e.g., Microsoft Word, Adobe Acrobat), and regular practice of this would bloat the associated .pst files, which can be somewhat prone to corruption.

There is no apparent reason to assume that users would want to organize messages any differently from the way they organize personal files. Much time is frequently wasted in searching for messages and files stored in the directory structures of different applications because there is no option for automatically aligning the directory structures of the different applications. Even if automatic alignment of the directory structures was possible, some time would still be wasted as a result of having to propagate the contents of one application into the corresponding directory locales of the alternate application, rather than having the contents automatically aligned and being able to see both files and messages within either application.

SUMMARY

It should be appreciated that this Summary is provided to introduce a selection of concepts in a simplified form, the concepts being further described below in the Detailed Description. This summary is not intended to identify key features or essential features of this disclosure, nor is it intended to limit the scope of the invention.

According to an exemplary embodiment, a method for synchronizing directory structures of a messaging application and a personal file manager application is provided. The method includes receiving a designation of at least one layer in a directory structure of the messaging application, receiving a designation of at least one layer in a directory structure of the personal file manager application, and associating the designated layer in the directory structure of the messaging application with the designated layer in the directory structure of the personal file manager application. Each time a folder is created or an existing folder is modified or deleted in the designated layer in the directory structure of the messaging application, a corresponding folder (including corresponding folder contents) is created, modified, or deleted in the designated layer in the directory structure of the personal file manager application. Each time a folder is created or an existing folder is modified or deleted in the designated layer in the directory structure of the personal file manager application, a corresponding folder (including corresponding folder contents) is created, modified, or deleted in the designated layer in the directory structure of the messaging application.

According to another embodiment, a computer program product is provided comprising a computer readable medium having encoded instructions. The encoded instructions, when executed by a computer, cause the computer to receive a designation of at least one layer in a directory structure of a messaging application, receive a designation of at least one layer in a directory structure of the personal file manager application, and associate the designated layer in the directory structure of the messaging application with the designated layer in the directory structure of the personal file manager application. Each time a folder is created or an existing folder is modified or deleted in the designated layer in the directory structure of the messaging application, a corresponding folder (including corresponding folder contents) is created, modified or deleted in the designated layer in the directory structure of the personal file manager application. Each time a folder is created or an existing folder is modified or deleted in the designated layer in the directory structure of the personal file manager application, a corresponding folder (including corresponding folder contents) is created, modified, or deleted in the designated layer in the directory structure of the messaging application.

According to another embodiment, a system is provided for synchronizing directory structures of a messaging application and a personal file manager application. The system includes an input for receiving a designation of at least one layer in a directory structure of the messaging application and receiving a designation of at least one layer in the directory structure of the personal file manager application. The system further includes a processor for associating the designated layer in the directory structure of the messaging application with the designated layer in the directory structure of the personal file manager application. Each time a folder is created or an existing folder is modified or deleted in the designated layer in the directory structure of the messaging application, the processor creates, modifies, or deletes a corresponding folder (including corresponding folder contents) in the designated layer in the directory structure of the personal file manager application. Each time a folder is created or an existing folder is modified or deleted in an existing folder in the designated layer in the directory structure of the personal file manager application, the processor creates, modifies, or deletes a corresponding folder (including corresponding folder contents) in the designated layer in the directory structure of the messaging application.

Other systems, methods, and/or computer program products according to various embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Exemplary embodiments will be described more fully hereinafter with reference to the accompanying figures, in which embodiments are shown. This invention may, however, be embodied in many alternate forms and should not be construed as limited to the embodiments set forth herein.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.) that runs on a processor such as a digital signal processor, collectively referred to as "circuitry" or "a circuit". Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

For ease of explanation, in the description that follows, an explanation of folder alignment in directory structures of a messaging application and a personal file manager application is provided. However, it should be appreciated that alignment of entire directories of many different applications may be performed in a similar manner.

Figure 1:
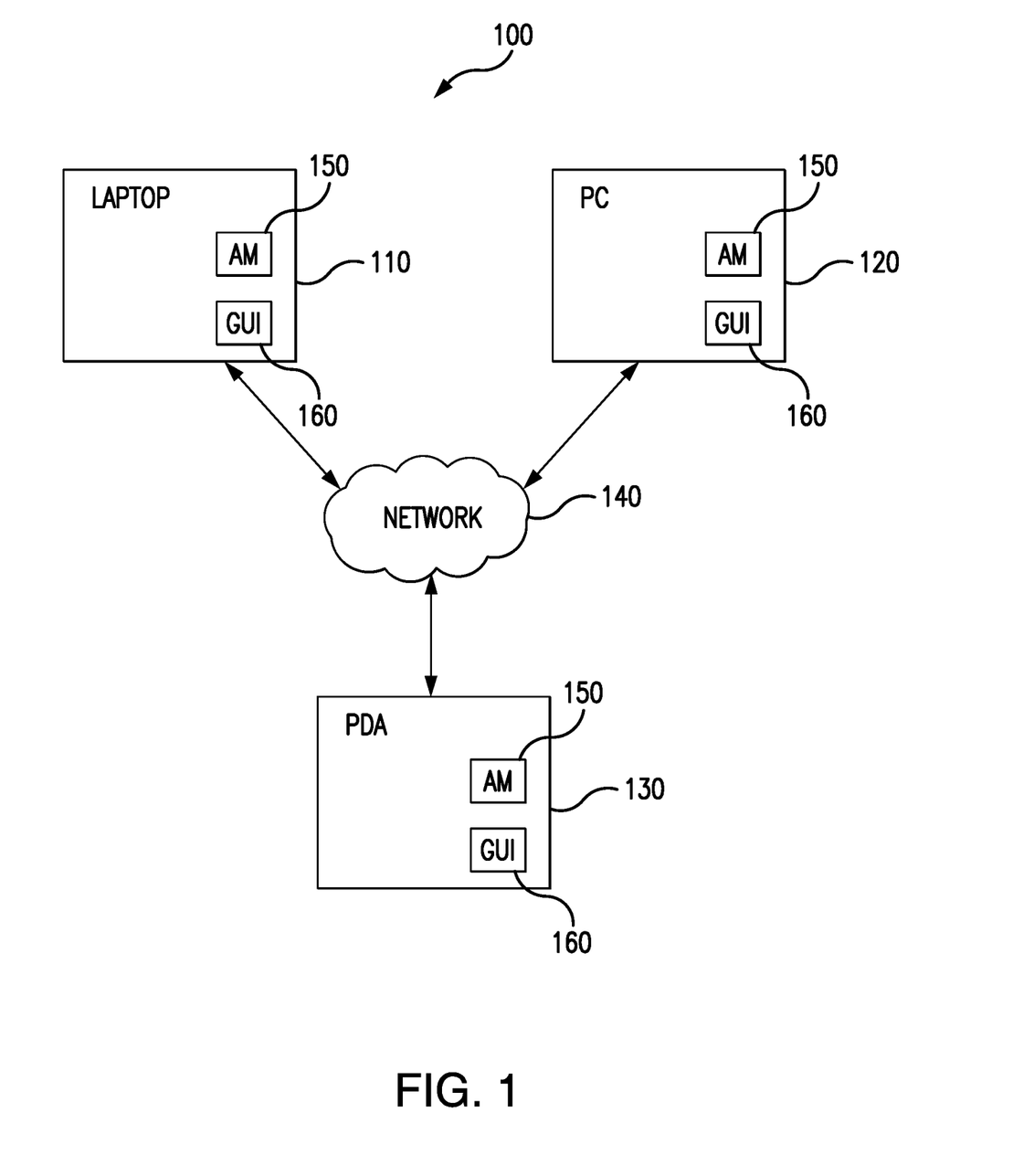
FIG. 1 illustrates an exemplary environment in which directory structure synchronization may be implemented according to exemplary embodiments.

FIG. 1 illustrates an environment 100 in which directory structure synchronization may be implemented according to exemplary embodiments. In the environment 100 shown in FIG. 1, various devices, including, e.g., a laptop 110, a personal computer (PC) 120, and a personal digital assistant (PDA) 130 are connected via a network 140. The network 140 may be a private network, a public network, or a combination thereof, and may be implemented as an Internet Protocol (IP) based network or in compliance with another network protocol. For example, the network 140 may include a local area network (LAN), a wide area network (WAN), the Internet, or a combination thereof. It should be appreciated that the devices shown in FIG. 1 connected to the network 140 are examples of devices that may be used in a directory structure synchronization environment, such as the environment 100, and are depicted for illustrative purposes. The directory structure synchronization environment 100 may include any device capable of storing an electronic file. Further, although the environment 100 shown in FIG. 1 is a networked environment, it should be appreciated that directory structure synchronization may also be performed locally.

According to exemplary embodiments, a software component, which may be referred to as an alignment module (AM) 150 may be included in one or more of the devices 110, 120, and 130. The software component may be local or network-based. According to one embodiment, the alignment module 150 may be installed and activated as part of installation of a device, so that the user can immediately benefit from the directory structure alignment or synchronization. As an alternative, the alignment module 150 may be installed on existing devices.

The alignment module 150 synchronizes or aligns dissimilar directory structures of different types of applications, such as a messaging application and a personal file manager application, within one or more of the devices 110, 120, and 130. The directory structures of the different types of applications may have several layers. For example, the directory structure of a messaging application may have a "work" folder containing several subfolders for different projects, e.g., design, marketing and manufacturing. Each of the folders and subfolders may, in turn, contain several subfolders, files, or links to files (described in further detail below).

According to exemplary embodiments, directory structure alignment may occur at various layers within the directory structures. For example, for new directory structures, a user may designate a base directory of the messaging application and designate a root directory of the personal file manager application. The user may designate these directories via a graphical user interface 160 included in the devices 110, 120, and 130. The alignment module 150 associates the designated base directory and the designated root directory.

As another example, an existing multi-layer directory structure of one application may be aligned with a new directory structure of another application. In this case, a user may designate a root or base directory for the new directory structure as well as subdirectories corresponding to subdirectories in the existing directory structure. Then, the alignment module 150 associates the layers of the new directory structure with the corresponding layers of the existing directory structure. In yet another example, two dissimilar existing directory structures may be aligned by associating various layers of the directory structures. In each of these two scenarios, where there is an existing directory structure, the folders and folder contents included in the designated layer of a directory structure of one application are copied to the associated designated layer of the directory structure of the other application, such that corresponding folders and folder contents are created in the associated designated layer of the directory structure of the other application.

According to one aspect of exemplary embodiments, directory structure synchronization, also referred to as directory structure alignment, may occur automatically if desired by the user.

According to another aspect of exemplary embodiments, the user may designate multiple instances of each application for which alignment should occur automatically, so that multiple pairs of messaging application directory structures and personal file manager application directory structures are automatically aligned with one another. The user may designate the instances of each application to be aligned via, e.g., the GUI 160. Thus, for example, a directory structure of a "home" instance of the messaging application may be aligned with the directory structure of a "home" instance of the personal file manager application. Similarly, a directory structure of a "work" instance of the same or a different messaging application may be aligned with the directory structure of a "work" instance of the same or a different personal file manager application. In this way, home emails and work emails may be aligned separately with home files and work files, respectively. As another example, emails and personal files relating to multiple customer accounts may be aligned separately.

According to an exemplary embodiment, each time a user creates a new directory or folder in the designated messaging application, an analogous directory or folder is created in the personal file manager application by the alignment module 150. Similarly, creation of a new directory or folder in the designated personal file manager application triggers the creation of an analogous directory or folder in the designated messaging application. Thus, the same directory structure is maintained on both the messaging application and the personal file manager application. Directory/folder deletions and modifications may likewise be replicated across both applications. As an option, deleted directories/folders may be archived to a separate location, such as a network drive. As directories and folders are created/modified/deleted across applications, the corresponding directory/folder contents (including, e.g. sub-folders, files, and/or links to files) are also created/modified/deleted.

Referring again to FIG. 1, if the alignment module 150 is used on the multiple devices 110, 120, and 130, and the devices are to be synchronized, the devices may communicate information regarding folder creation, modification, and deletions between one another. Thus, for example, if a folder is created in a directory structure of a messaging application in one of the devices, such as the laptop 110, the user may desire that this information be transmitted to other devices, e.g., the PC 120 and the PDA 130, so that that the directory structures of the messaging applications and the personal file manager applications of all the devices 110, 120, and 130 are synchronized. As the laptop 110 creates or modifies/deletes a folder created in the directory structure of the messaging application in the directory of the personal file manager application of the laptop 110, the PC 120 and the PDA 130 may also update the directory structures in their respective messaging applications and personal file manager applications to reflect creation/modification/deletion of the folder (including folder contents) in the directory structure of the messaging application of the laptop 110. Similarly, if a folder is created/modified/deleted in a directory structure of the personal file manager application on one of the devices 110, 120, 130, a corresponding folder (including corresponding folder contents) may be created/modified/deleted in the directory structures of the personal file manager applications of the other devices as well as in the directory structures of the messaging applications of each of the devices.

In addition to copying folders (and folder contents) in associated directory structures in different applications, according to an exemplary embodiment, the alignment module 150 may create links to files included in associated directories. Thus, for example, when a message in the messaging application is created, moved, or received, the alignment module 150 may create a link to that message in the associated directory in the personal file manager application. Similarly, if a new file is created or modified in a directory in the personal file manager application, the alignment module 150 may create a link to that file in the associated directory in the messaging application.

According to one embodiment, the user may be offered the option of copying a file or a message from one application to another instead of creating a link to a file or a message as described above. This option may be offered to a user, e.g., when a user creates a new folder, via, e.g., the GUI 160. The user may select whether a copy of each item in a directory structure of one application should be replicated in the associated directory structure of another application or whether a link should be created in the associated directory structure that a user may select to invoke the item and its associated application.

As explained above, folder contents may include subfolders, files, and/or links to files. Thus, when one folder is created or modified in one application, the corresponding folder and folder contents (that may include a tree of folders and files or links) in the other application are created/modified. Similarly, when a folder is deleted in one application, the corresponding folder and folder contents (that may include a tree of folders and files or links) in the other application are deleted. According to an exemplary embodiment, once the folder linkages have been established, any creation/modification/deletion of any folder contents is then propagated to all designated "linked" folders. Folder linkages continue to remain aligned until the user changes the directory structure designation or other settings.

In addition to enabling directory synchronization, the alignment module 150 enables users to view messages through a personal file manager application browser and view personal files through a messaging application browser. This viewing may occur via, for example, the graphical user interface 160 included in a device including the alignment module 150.

Figure 2A:
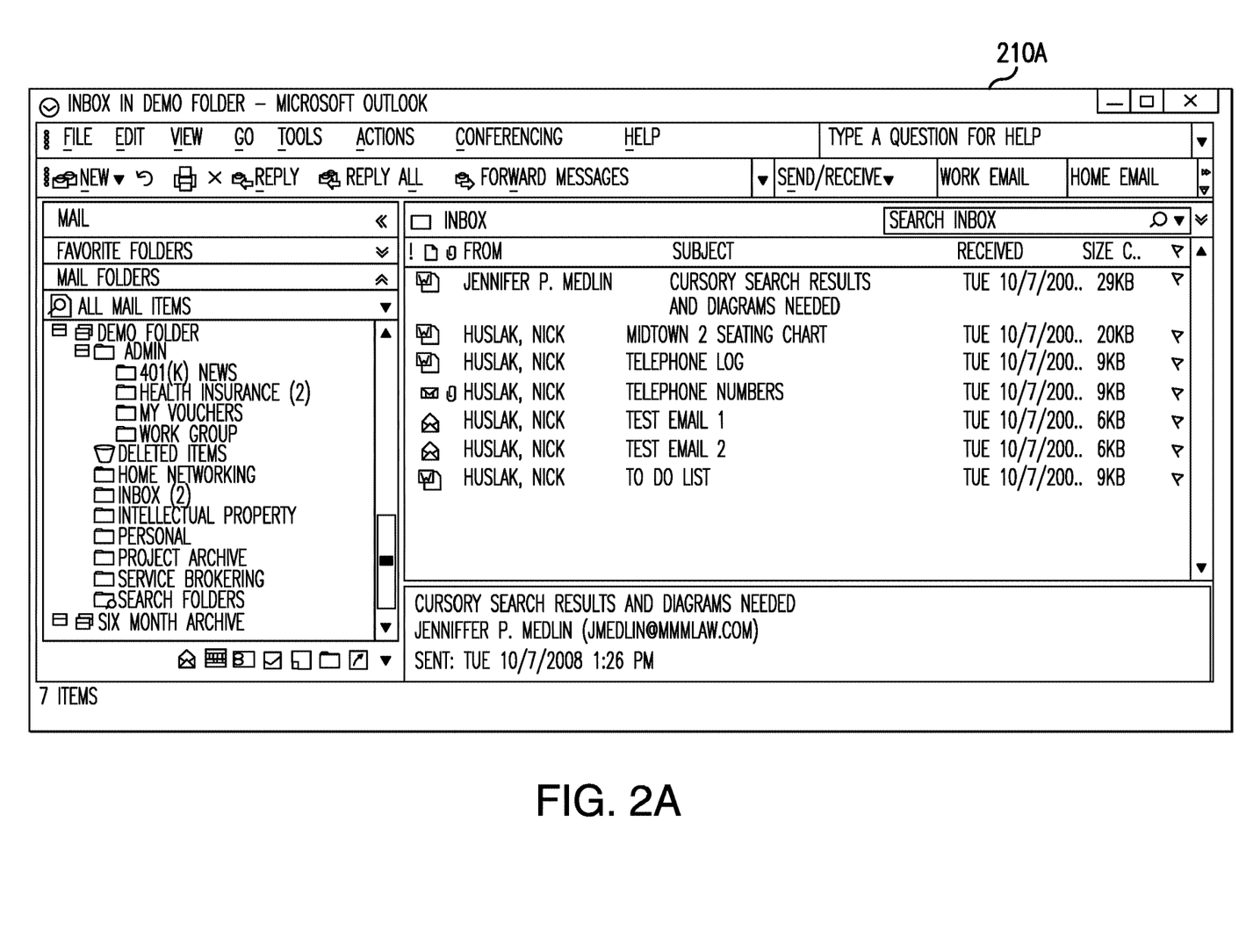
FIGS. 2A, 2B, 2C, and 2D depict exemplary screen shots of a user interface for directory structure synchronization according to an exemplary embodiment.
Figure 2B:
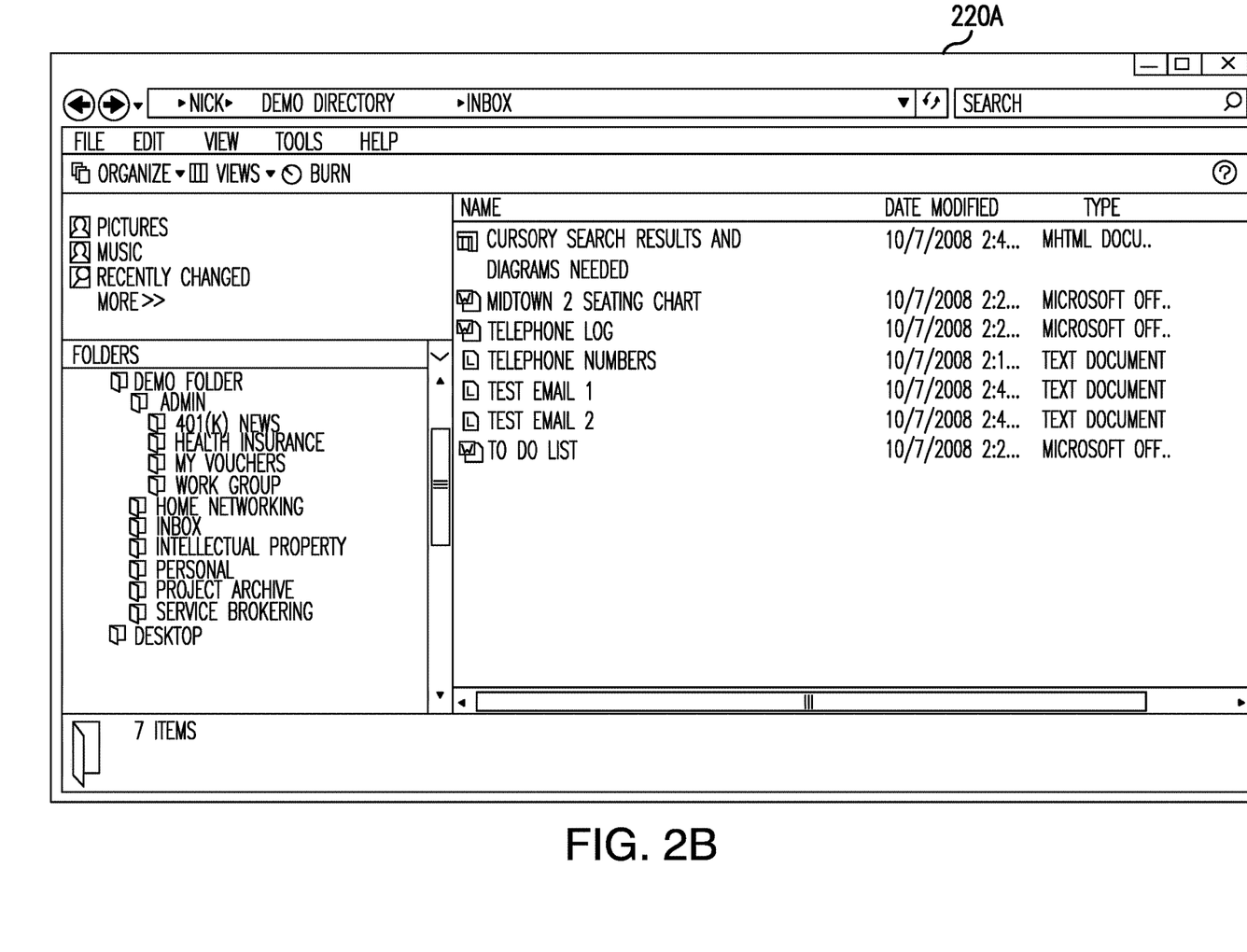

FIGS. 2A-2D depict exemplary screen shots of a user interface for directory structure synchronization according to an exemplary embodiment. These screen shots may be viewed using a graphical user interface, such as the GUI 160. Referring to FIG. 2A, a screen shot 210A viewed via a browser of a messaging application, e.g., Microsoft Outlook, is shown. In FIG. 2B, a screen shot 220A viewed via a browser of a personal file manager application, e.g., Windows Explorer, is shown. Comparing the screen shots and 210A and 220A, it can be seen that the Inbox folder of the messaging application is synchronized with a folder named "Inbox" in the personal file manager application. As explained above, when a message in the messaging application is created, moved, or received, the alignment module 150 copies the message or creates a link to that message in the associated directory in the personal file manager application. Similarly, if a new file is created or modified in a directory in the personal file manager application, the alignment module 150 copies the file or creates a link to that file in the associated directory in the messaging application Thus, for example, referring to FIG. 2A, "Test Email 1", "Test Email 2", and "Telephone Numbers" are email messages in Outlook. As shown in FIG. 2B, links to these messages are created and appear in the Inbox folder in Explorer. The files entitled "Cursory Search Results and Diagrams Needed", "Midtown 2 Seating chart", "Telephone Log" and "To do list" shown in FIG. 2B correspond to files created and saved in the Inbox folder in Explorer. As shown in FIG. 2A, copies of these files are created in the Demo Folder/Inbox folder within Outlook.

Figure 2C:
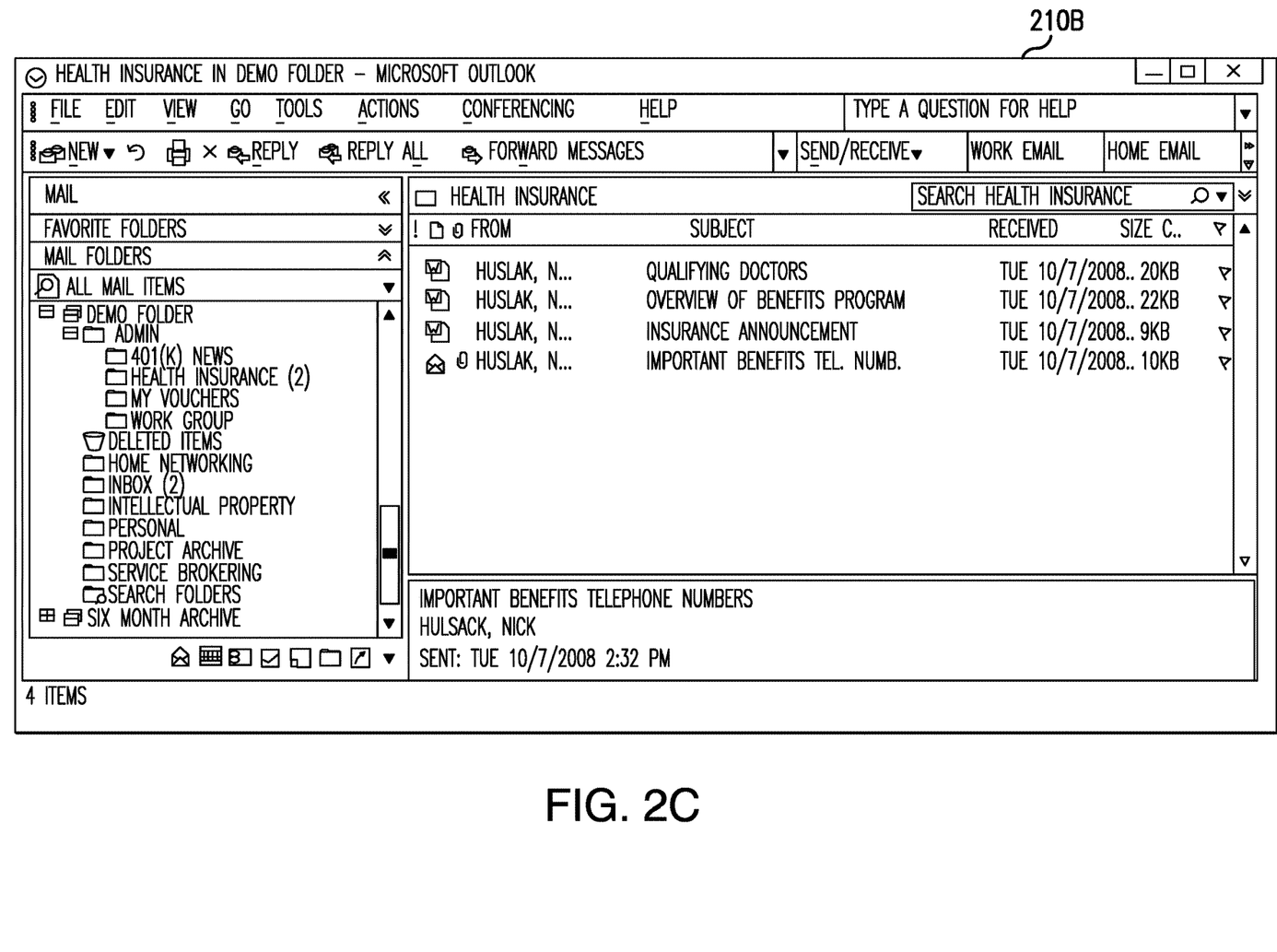
Figure 2D:
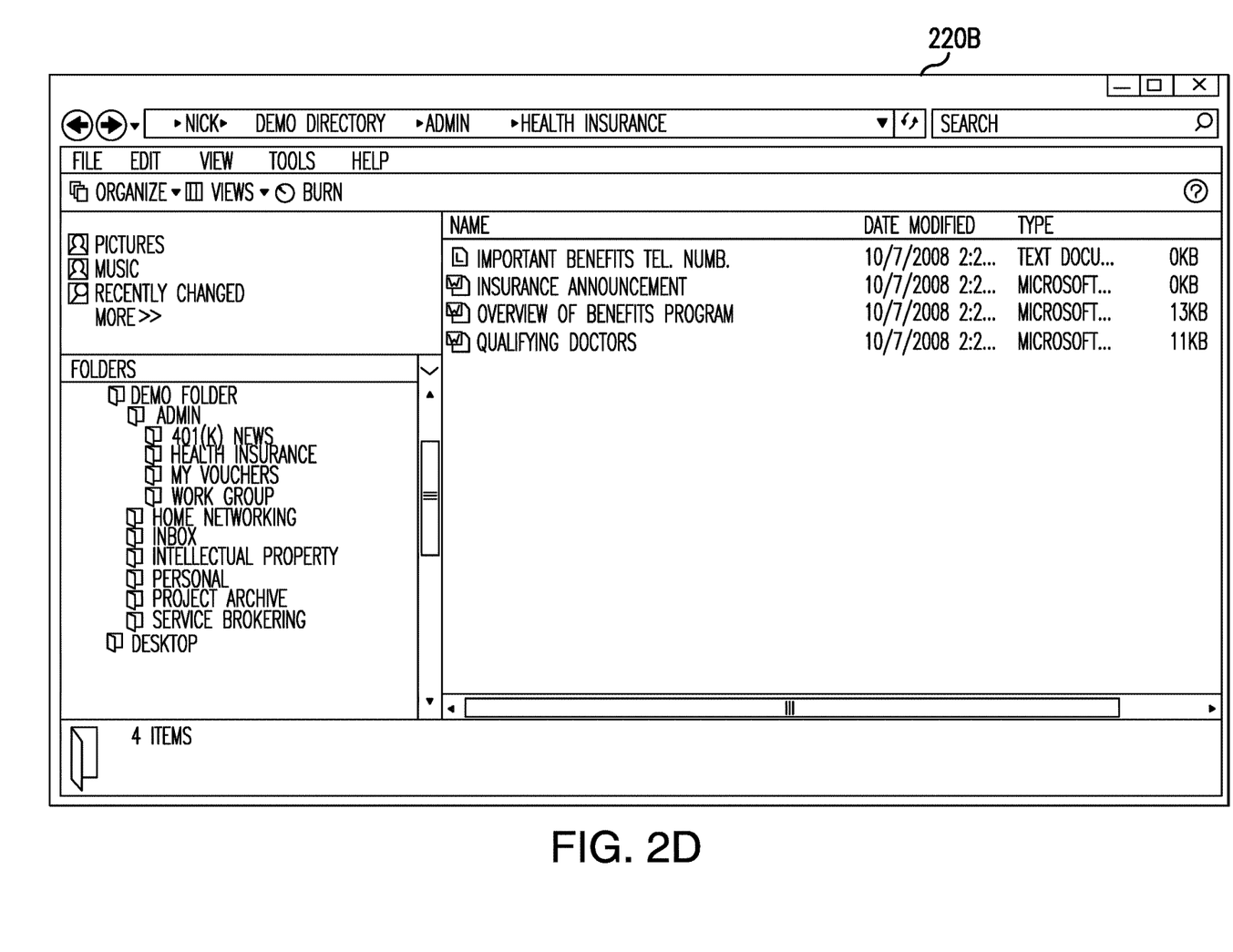

As another example, referring to FIGS. 2C and 2D, a screen shot 210B viewed via a browser of a messaging application, e.g., Microsoft Outlook, is shown in FIG. 2C, and a screen shot 220B viewed via a browser of a personal file manager application, e.g., Windows Explorer, is shown in FIG. 2D. Comparing FIGS. 2C and 2D and, it can be seen that the embedded directory structure of the Outlook application is replicated in the Explorer application. For example, both FIGS. 2C and 2D depict a directory structure including a Demo Directory folder having an Admin folder embedded within it, with a Health Insurance folder embedded within the Admin folder. As shown in FIG. 2C, the Health Insurance folder in Outlook includes an email message entitled "Important benefits telephone numbers" created in Outlook and copies of three other files created in Explorer. As shown in FIG. 2D, the Health Insurance folder in Explorer includes the files created in Explorer and a link to the email created in Outlook.

As shown in FIGS. 2A-2D, the files and messages viewable in the browsers of the messaging application and the personal file manager application may appear with application—related icons indicating the application name or type of application associated with a file or message as well as an indicator indicating the type of file or message. For example, in FIG. 2B, the files labeled "Telephone Number", "Test email 1", and "Test email 2" each appear with an icon indicating a link to an email message and a text file type indicator specifying that the link is stored as a text file. Alternatively, if these files were copied from the messaging application to the personal file manager application (rather than having links created in the personal file manager application), text icons rather than link icons may appear. The files labeled "Midtown 2 Seating Chart", "Telephone Log", and "To Do List" each appears with a Microsoft Word icon and an indicator specifying that the file is a Microsoft Office document. The "Cursory Search Results and Diagrams Needed" item appears with an icon and an indicator specifying that the file is an MHTML document. Similarly, the files illustrated in FIG. 2A may appear with application-related icons. Also, information regarding the time and date the file or message was modified or created may be displayed. Further, the files and messages replicated between the messaging application and the personal file manager may include not only the file/message content but also header information, such as the title. For example, referring to FIGS. 2C and 2D, the email message entitled "Important benefits telephone numbers" that is created via the messaging application is replicated as a link into the designated directory of the personal file manager application with the same title.

It should be appreciated that the icons and message/file type indicator described above are given as one example. The information that appears in the browser along with the replicated file or message may be customized by the user and may reflect locally-stored associations between file types and applications.

Referring again to FIGS. 2A and 2C, the messaging application includes various fields, e.g., a FROM field, a SUBJECT field, a SIZE field, and a RECEIVED field. The messaging application may also include a TO field. According to an exemplary embodiment, when files or links to files in the personal file manager application are copied/created in the messaging folder, these fields are populated with information from the personal file manager application. For example, the TO and FROM fields of the messaging application may be populated with a user's name drawn from the personal file manager application. The SUBJECT field of the messaging application may be populated with the name of a file drawn from the personal file manager application. The SIZE field of the messaging application may be populated with the size of a file drawn from the personal file manager application. The RECEIVED field of the messaging application may be populated with a creation or modification date of a file drawn from the personal file manager application. Also, a FILE TYPE field may be created for the messaging application. The FILE TYPE field may be populated with a type of file drawn from the personal file manager application.

Referring to FIGS. 2B and 2D, the personal file manager application includes various fields, e.g., a NAME field, a DATE MODIFIED field, and a TYPE field. The personal file manager application may also include a SIZE field (not shown). According to an exemplary embodiment, when messages or links to messages in the messaging application are copied/created in the personal file manager application, these fields are populated with information from the messaging application. For example, the NAME field of the personal file manager application may be populated with the subject of a message drawn from the messaging application. The DATE MODIFIED field of the personal file manager application may be populated with a date received drawn from the messaging application. The TYPE field of the personal file manager application may be populated with the word TEXT, regardless of whether a link to the message is created or a copy of the message is created. The SIZE field of the personal file manager application may be populated with a size of a message drawn from the messaging application.

According to exemplary embodiments, the fields of the personal file manager application and the messaging application may be automatically populated or populated based upon user specifications. Thus, the user has the option of deciding which fields of a file in the personal file manager application to preserve when a file is copied or a link to the file is created in the messaging application. Similarly, the user has the option of deciding which fields of a message in the messaging application to preserve when a message is copied or a link to the message is created in the personal file manager application. The user may select which fields to preserve via, e.g., the GUI 160.

Figure 3:
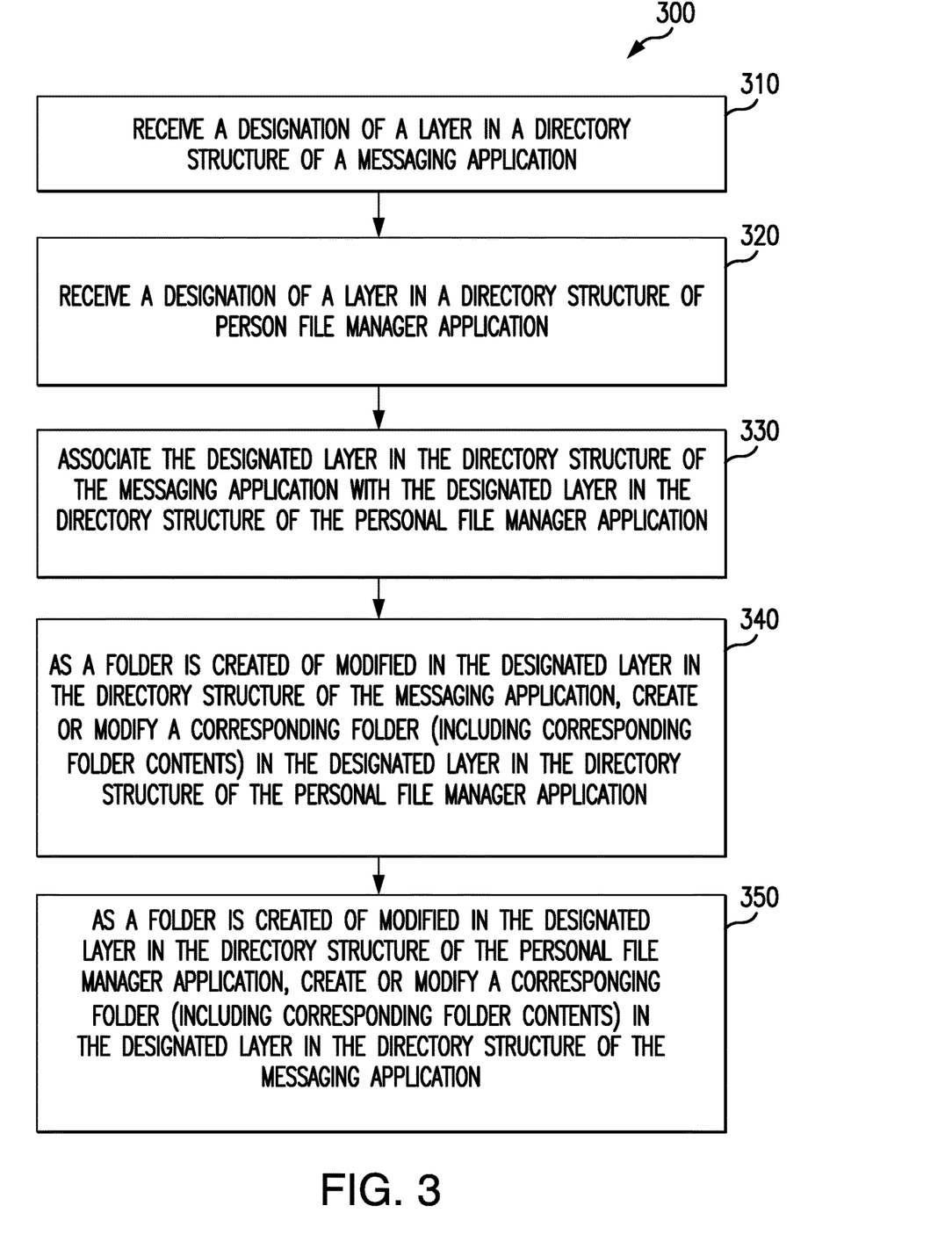
FIG. 3 is a flow diagram illustrating an exemplary process for directory structure synchronization according to an exemplary embodiment.

FIG. 3 is a flow diagram illustrating an exemplary process 300 for directory synchronization according to an exemplary embodiment. At step 310, a designation of a layer in a directory structure of the messaging application is received by the alignment module 150. At step 320, a designation of a layer in a directory structure of the personal file manager application is received at the alignment module 150. It should be appreciated that the order of steps 310 and 320 may be reversed. Further, these steps may occur at the same time. The designation of the layers in the directory structures of the messaging application and the personal file manager application may be made by a user by entering the names of the layers via a graphical user interface, such as the GUI 160. At step 330, the alignment module 150 associates the designated layer in the directory structure of the messaging application with the designated layer in the directory structure of the personal file manager application.

At step 340, as a folder is created or modified in the designated layer in the directory structure of the messaging application, a corresponding folder (including corresponding folder contents) is created or modified in the designated layer in the directory structure of the personal file manager application by the alignment module 150. At step 350, as a folder is created or modified in the designated layer in the directory structure of the personal file manager application, a corresponding folder (including corresponding folder contents) is created or modified in the designated layer in the directory structure of the messaging application by the alignment module 150. It should be appreciated that steps 340 and 350 may be performed in reverse order or at the same time. Also, steps 340 and 350 may be repeated each time a folder is created or modified.

Although not shown in FIG. 3, it should be appreciated that each time a folder and its contents are deleted from the messaging application or the personal file manager application, a corresponding folder and its contents may be deleted from the personal file manager application or the messaging application, respectively.

It should be appreciated that while FIG. 3 and the description above are directed towards bidirectional alignment of directory structures of different applications, the user may select unidirectional alignment of directory structures of different applications. This selection may be made, e.g., via the GUI 160.

As noted above, the user has many options for customizing directory structure alignment. For example, the user may select instances of applications for which directory structures are synchronized, select fields of a message header of a message in the messaging application that are preserved when a corresponding message is created in the personal file manager application, and select fields of a file in the personal file manager application that are preserved when a corresponding file is created in the messaging application. In addition, the user may select whether directory structure alignment occurs bidirectionally, such that the directory structure of the messaging application is aligned with the directory structure of the personal file manager application and the directory structure of the file manager application is aligned with the directory structure of the messaging application, or unidirectionally, such that either the directory structure of the messaging application is aligned with the directory structure of the personal file manager or the directory structure of the personal file manager is aligned with the directory structure of the messaging application. Also, the user may select application settings, such as turning the synchronization function on or off globally or on a per-structure basis, and setting preferences, such as whether corresponding directory folder deletions are performed automatically or after some delete confirmation prompt is presented and confirmed. Each of these selections may be performed via the GUI 160.

Figure 4:
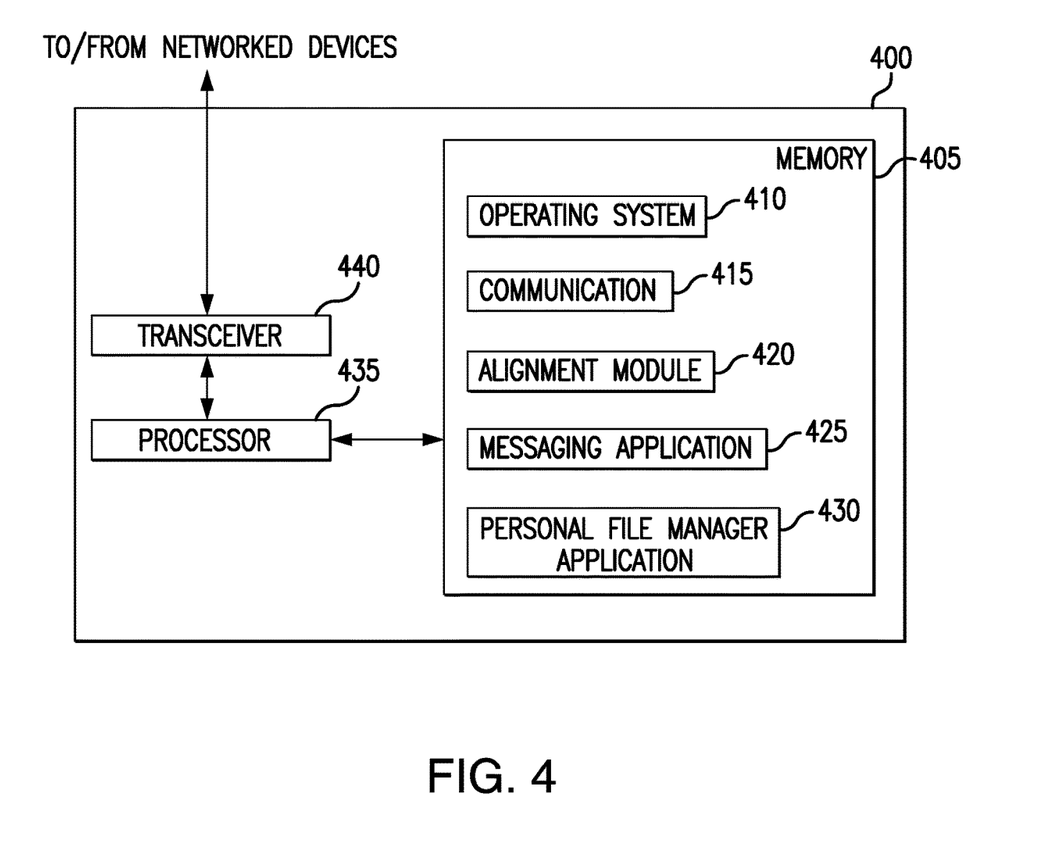
FIG. 4 illustrates an exemplary system for performing directory structure synchronization according to an exemplary embodiment.

FIG. 4 illustrates an exemplary system 400 for performing directory structure synchronization according to an exemplary embodiment. In some embodiments, the system may be included in multiple networked devices, e.g., devices 110, 120, and 130 shown in FIG. 1. In other embodiments, the system may be included in one or fewer devices. Thus, directory structure synchronization may be performed via a network or locally.

Referring now to FIG. 4, the directory structure synchronization system 400 includes a processor 435 and a memory 405. The processor 435 communicates with the memory 405 via an address/data bus. The processor 435 may be, for example, a commercially available or custom microprocessor. The memory 405 is representative of the one or more memory devices containing the software and data used to facilitate directory synchronization in accordance with some embodiments. The memory 405 may include, but is not limited to, the following types of devices: cache, ROM, PROM, EPROM, EEPROM, flash, SRAM, and DRAM. The system may also include a transceiver 440 in communication with the processor 435. The transceiver 440 includes a transmitter circuit and a receiver circuit, which may be used to establish and maintain communication with other devices, e.g., for networked directory synchronization.

As shown in FIG. 4, the memory 405 may contain multiple categories of software and/or data, including an operating system 410, an optional communication module 415, an alignment module 420, a messaging application 425, and a personal file manager application 430. The operating system 410 generally controls the operation of the alignment module 420, the messaging application 425 and the personal file manager application 430. In particular, the operating system 410 may manage the software and/or hardware resources of the alignment module 420, the messaging application 425, and the personal file manager application 430 and may coordinate execution of programs by the processor 435. The optional communication module 415 may be configured to manage the communication protocols, including both wireless and wireline protocols, that are used by the transceiver 440 to communicate with other devices, via, e.g., the network 140 as shown in FIG. 1.

Although FIG. 4 illustrates an exemplary system for performing directory synchronization accordance with some embodiments, it will be understood that the present invention is not limited to such a configuration but is intended to encompass any configuration capable of carrying out operations described herein.

Computer program code for carrying out operations of devices, terminals, and/or systems discussed above with respect to FIGS. 1-4 may be written in a high level programming language, such as Java, C, and/or C++, for development convenience. In addition, computer program code for carrying out operations of embodiments may also be written in other programming languages, such as, but not limited to, interpreted languages. Some modules or routines may be written in assembly language or even micro code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to message flow, flowchart and/or block diagram illustrations of methods, devices, and/or computer program products. These message flow, flowchart and/or block diagrams further illustrate exemplary operations for performing directory synchronization in accordance with various embodiments. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for synchronizing directory structures, comprising:
    responsive to a change in a first file of a first directory structure of a first computing device, causing, by a processor, an offer to select between at least two options to be presented to a second computing device, wherein the at least two options include: a copying option to copy the first file to a second directory structure of the second computing device and a link creating option to create a link to the first file in the second directory structure of the second computing device;
    wherein, based on an indication of selection of the copying option, the first file is copied by the processor to the second directory structure of the second computing device by populating first fields of the second directory structure of the second computing device with data from the first file corresponding to second fields of the first directory structure; and wherein, based on an indication of selection of the link creating option, the link to the first file is created by the processor in the second directory structure the second computing device.

2. The method of claim 1, wherein the first fields of the second directory structure to be populated are selected in response to a user input.

3. The method of claim 1, wherein the first fields include one or more of: a FROM field, a SUBJECT field, a SIZE field, a RECEIVED field, a TO field, a FILE TYPE field, a NAME field, a DATE MODIFIED field, a TYPE field, or a SIZE field.

4. The method of claim 1, wherein the first directory structure corresponds to a messaging application, and the second directory structure corresponds to a personal file manager application.

5. The method of claim 1, wherein responsive to the selection of the link creating option, the first fields of the second directory structure are populated in accordance with the second fields of the first directory structure.

6. The method of claim 1, wherein the change in the first directory structure includes at least one of addition of a sub-directory comprising directory contents and creation of a folder.

7. The method of claim 1, further comprising:
receiving, by the processor, a third directory structure residing on a third computing device; and
associating, by the processor, the third directory structure with the first directory structure residing on the first computing device.

8. A computer-readable storage device having a first application, the computer-readable storage device comprising computer-readable instructions that, when executed by a processor, cause the processor to perform operations comprising:
responsive to a change in a first file of a first directory structure, causing, by the processor, an offer to select between at least two options to be presented via a second computing device, wherein the at least two options include: a copying option to copy the first file to a second directory structure residing on the second computing device and a link creating option to create a link to the first file in the second directory structure of the second computing device;
wherein the first directory structure corresponds to a messaging application, and the second directory structure corresponds to a personal file manager application;
wherein, based on a selection of the copying option, the first file is copied to the second directory structure; and
wherein, based on a selection of the link creating option, the link to the first file is created in the second directory structure.

9. The computer-readable storage device of claim 8, wherein the operations further comprise:
responsive to a change in the second directory structure, the change including a change in a second file of the second directory structure, causing another offer to select between at least two other options, wherein the at least two other options include: another copying option to copy the second file to the first directory structure and another link creating option to create a link to the second file in the first directory structure;
wherein responsive to selection of the other copying option, the second file is copied to the first directory structure; and
wherein responsive to selection of the other link creating option, the link to the second file is created in the first directory structure.

10. The computer-readable storage device of claim 8, wherein the first directory structure is distinct from the second directory structure.

11. The computer-readable storage device of claim 10, wherein, responsive to the selection of the copying option, the first file is copied to the second directory structure by populating first fields of the second directory structure with data from the first file corresponding to second fields of the first directory structure.

12. The computer-readable storage device of claim 11, wherein the first fields of the second directory structure to be populated are selected in response to a user input.

13. The computer-readable storage device of claim 11, wherein the first fields include one or more of: a FROM field, a SUBJECT field, a SIZE field, a RECEIVED field, a TO field, a FILE TYPE field, a NAME field, a DATE MODIFIED field, a TYPE field, or a SIZE field.

14. The computer-readable storage device of claim 8, wherein the operations further comprise:
receiving a third directory structure; and
associating the third directory structure with the first directory structure.

15. A computing device comprising:
a hardware processor; and
a hardware memory having stored thereon a first directory structure and instructions which, when executed by the hardware processor of the computing device, cause the hardware processor to perform operations for synchronizing directory structures, comprising:
responsive to a change in a first file of the first directory structure, causing, by the processor, an offer to select between at least two options to be presented via a second computing device, wherein the at least two options include: a copying option to copy the first file to a second directory structure of the second computing device and a link creating option to create a link to the first file in the second directory structure of the second computing device;
wherein, based on a selection of the copying option, the first file is copied to the second directory structure; and
wherein, based on a selection of the link creating option, the link to the first file is created in the second directory structure;
wherein the first directory structure includes one or more of: a FROM field, a SUBJECT field, a SIZE field, a RECEIVED field, a TO field, a FILE TYPE field, a NAME field, a DATE MODIFIED field, a TYPE field, or a SIZE field.

16. The computing device of claim 15, wherein the operations further comprise:
responsive to a change in the second directory structure, the change including a change in a second file of the second directory structure, causing another offer to select between at least two other options, wherein the at least two other options include: i) another copying option to copy the second file to the first directory structure and ii) another link creating option to create a link to the second file in the first directory structure;
wherein based on a selection of the other copying option, the second file is copied to the first directory structure; and
wherein based on a selection of the other link creating option, the link to the second file is created in the first directory structure.

17. The computing device of claim 16, wherein the change in the second directory structure includes at least one of addition of a sub-directory comprising directory contents and creation of a folder.

18. The computing device of claim 15, wherein the first directory structure is distinct from the second directory structure.

19. The computing device of claim 15, wherein the first directory structure corresponds to a messaging application, and the second directory structure corresponds to a personal file manager application.

20. The computing device of claim 15, wherein the change in the first directory structure includes at least one of addition of a sub-directory comprising directory contents and creation of a folder.

* * * * *